United States Patent
Parmar et al.

(10) Patent No.: US 10,715,651 B2
(45) Date of Patent: *Jul. 14, 2020

(54) MULTILAYER MOBILE APP INTERFACE

(71) Applicant: EMC IP Holding Company LLC, Hopkinton, MA (US)

(72) Inventors: Varun Parmar, San Jose, CA (US); Hironmay Basu, Mountain View, CA (US); Eric Lee, Union City, CA (US); Anand Taralika, Sunnyvale, CA (US); Alok Irde, Santa Clara, CA (US); Patrick Thompson, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,525

(22) Filed: Oct. 31, 2019

(65) Prior Publication Data

US 2020/0068061 A1 Feb. 27, 2020

Related U.S. Application Data

(63) Continuation of application No. 16/402,469, filed on May 3, 2019, now Pat. No. 10,498,876, which is a continuation of application No. 16/196,248, filed on Nov. 20, 2018, now Pat. No. 10,326,873, which is a continuation of application No. 15/961,639, filed on Apr. 24, 2018, now Pat. No. 10,171,642, which is a continuation of application No. 15/638,625, filed on Jun. 30, 2017, now Pat. No. 9,986,081, which is a continuation of application No. 14/501,987, filed on Sep. 30, 2014, now Pat. No. 9,736,288.

(60) Provisional application No. 62/017,751, filed on Jun. 26, 2014.

(51) Int. Cl.
*H04M 1/725* (2006.01)
*G06F 3/0482* (2013.01)
*G06F 3/0485* (2013.01)
*H04W 4/50* (2018.01)

(52) U.S. Cl.
CPC ...... *H04M 1/72522* (2013.01); *G06F 3/0482* (2013.01); *G06F 3/0485* (2013.01); *H04W 4/50* (2018.02)

(58) Field of Classification Search
CPC .............. H04M 1/72522; G06F 3/0485; G06F 3/0482; H04W 4/50
See application file for complete search history.

(56) References Cited

U.S. PATENT DOCUMENTS

| | | | |
|---|---|---|---|
| 9,736,288 B1 * | 8/2017 | Parmar | ................. G06F 3/0485 |
| 9,986,081 B2 * | 5/2018 | Parmar | ............. H04M 1/72522 |
| 10,171,642 B2 * | 1/2019 | Parmar | ............. H04M 1/72522 |
| 10,326,873 B2 * | 6/2019 | Parmar | ................. G06F 3/0482 |
| 10,498,876 B2 * | 12/2019 | Parmar | .................. H04W 4/50 |

(Continued)

*Primary Examiner* — Brandon J Miller
(74) *Attorney, Agent, or Firm* — Van Pelt, Yi & James LLP

(57) ABSTRACT

Systems and techniques to display app content are disclosed. In various embodiments, an indication is received to save an application page. An image of the application page and associated application state information are stored. The image and state information may be used to provide a user-navigable interface that enables a user to navigate back to the saved page.

21 Claims, 9 Drawing Sheets

(56) References Cited

U.S. PATENT DOCUMENTS

| | | | |
|---|---|---|---|
| 2006/0041847 A1* | 2/2006 | Maw | G06F 3/0483 715/793 |
| 2010/0306679 A1 | 12/2010 | Wu | |
| 2012/0311429 A1 | 12/2012 | Decker | |
| 2013/0311429 A1* | 11/2013 | Agetsuma | G06F 11/1451 707/640 |
| 2014/0068484 A1* | 3/2014 | Hyun | G06F 3/0486 715/769 |
| 2014/0098085 A1* | 4/2014 | Lee | G06F 3/0487 345/419 |
| 2014/0253574 A1* | 9/2014 | Brown | G06T 1/0007 345/545 |

* cited by examiner

MULTILAYER MOBILE APP INTERFACE

CROSS REFERENCE TO OTHER APPLICATIONS

This application is a continuation of U.S. patent application Ser. No. 16/402,469, entitled MULTILAYER MOBILE APP INTERFACE filed May 3, 2019 which is incorporated herein by reference for all purposes, which is a continuation of U.S. patent application Ser. No. 16/196,248, entitled MULTILAYER MOBILE APP INTERFACE filed Nov. 20, 2018, now U.S. Pat. No. 10,326,873, which is incorporated herein by reference for all purposes, which is a continuation of U.S. patent application Ser. No. 15/961,639, entitled MULTILAYER MOBILE APP INTERFACE filed Apr. 24, 2018, now U.S. Pat. No. 10,171,642, which is incorporated herein by reference for all purposes, which is a continuation of U.S. patent application Ser. No. 15/638,625, entitled MULTILAYER MOBILE APP INTERFACE filed Jun. 30, 2017, now U.S. Pat. No. 9,986,081, which is incorporated herein by reference for all purposes, which is a continuation of U.S. patent application Ser. No. 14/501,987, entitled MULTILAYER MOBILE APP INTERFACE filed Sep. 30, 2014, now U.S. Pat. No. 9,736,288, which is incorporated herein by reference for all purposes, which claims priority to U.S. Provisional Application No. 62/017,751, entitled MULTILAYER MOBILE APP INTERFACE filed Jun. 26, 2014 which is incorporated herein by reference for all purposes.

BACKGROUND OF THE TECHNOLOGY

Some mobile devices only allow a currently active view of a single mobile application to run and be available to users (in the "foreground") at any given time. Mobile application users, however, may desire to use multiple application features, associated with different pages or views, at the same time, for example, switching between views to perform actions available in different views.

BRIEF DESCRIPTION OF THE DRAWINGS

Various embodiments of the technology are disclosed in the following detailed description and the accompanying drawings.

DETAILED DESCRIPTION

Figure 1:
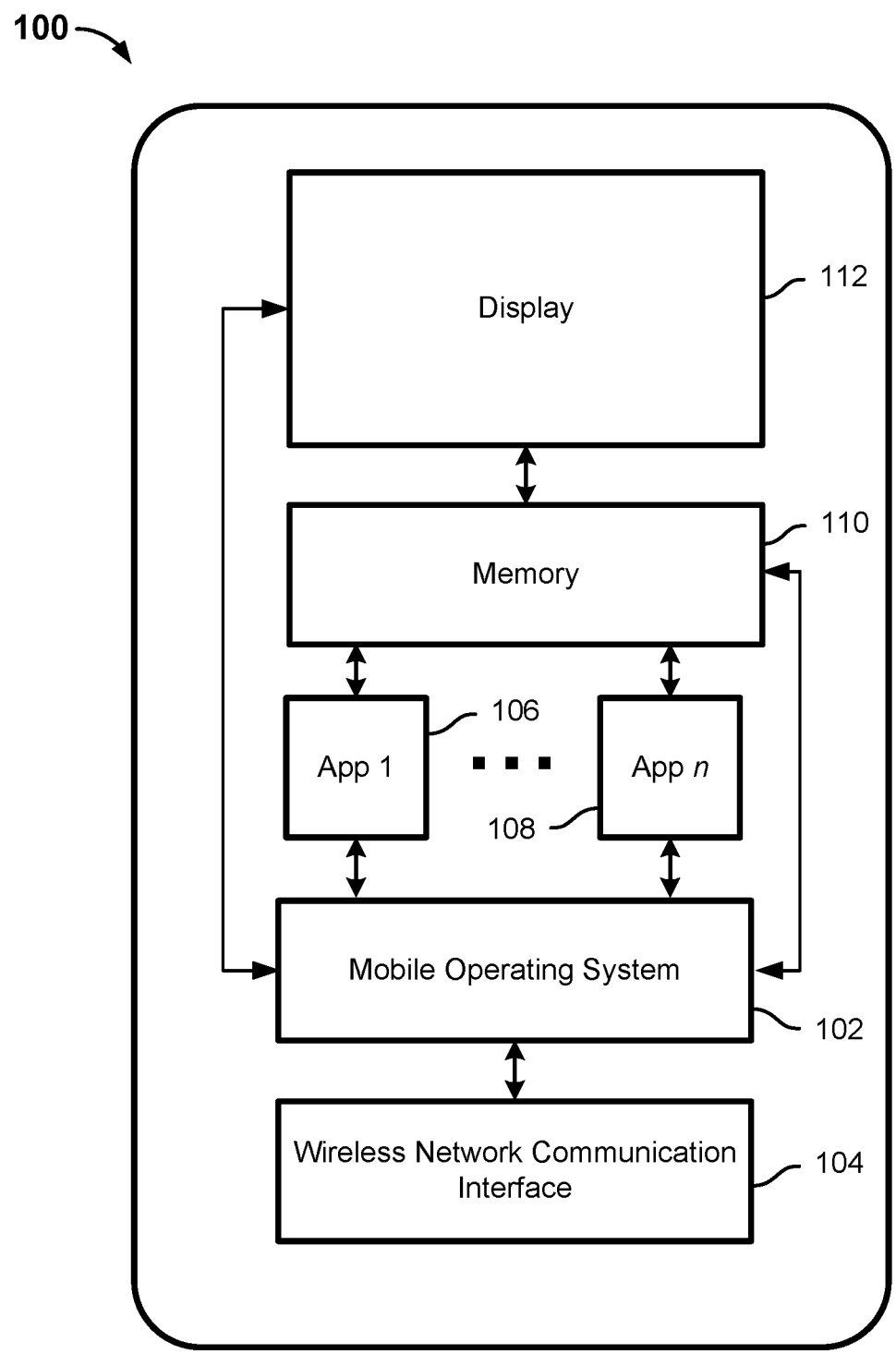
FIG. 1 is a block diagram illustrating an example embodiment of a mobile device.

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A multilayer mobile app interface is disclosed. In various embodiments, a multilayer interface and/or the appearance, and the user level experience and functionality associated with a multilayer interface, are provided in a mobile environment in which only one application and view are able to be in the "foreground" at any time, e.g., as with currently available versions of Apple Inc.'s® iOS® mobile operating system and associated devices. In various embodiments, images of prior screens are used to represent previously active windows or views. Application state associated with a window or view may be stored and used to provide an active application page or view associated with the image, e.g., upon selection of the image by a user.

In some embodiments, when a user touches the display for more than a prescribed time (e.g., 0.8 seconds), a snapshot (image) is taken of the currently-displayed mobile application page/view. A reduced sized view of the image is displayed. In addition, associated mobile app state information (e.g., data values, etc.), if any, are stored. The user can drag or swipe the image downward to "dock" the associated mobile app view/page and move on to other views. In some embodiments, docking results in a display in which an icon representing the docked page or view may be displayed in a "tray" area at the bottom of the display. In some embodiments, the tray area may be displayed using a 3D effect, as in the example shown below.

FIG. 1 is a block diagram illustrating an example embodiment of a mobile device. In the example shown, mobile device 100, e.g., a mobile phone, tablet, or other mobile device, includes a mobile operating system 102 running on a processor (not shown). Mobile network connectivity is provided via a wireless network communication interface 104, which is configured to transmit and receive information via a wireless radiotelephone subsystem that includes an antenna, transceiver, and associated components to provide wireless communication connectivity via a mobile network to other mobile devices and to networked computers, such as computer servers, via the Internet and/or other networks. A set of mobile applications (sometimes "mobile app" or "app"), represented in FIG. 1 by mobile apps 106 and 108, are stored on the mobile device 100 on a storage drive or other persistent storage device (not shown) and each is configured to run on top of mobile operating system 102, including by invoking services of mobile operating system 102 to communicate via wireless network communication interface 104 with remote resources, such as application servers running applications and/or services with which the mobile app is associated. Mobile operating system 102 and mobile apps represented by apps 106 and 108 have access to and use a memory 110 to store and retrieve data. For example, mobile operating system 102 may allocate to each app a region of memory to be used by that app to store app-related data. Similarly, each app may be allocated a set of logical locations in a persistent storage managed by mobile operating system 102, e.g., an app-specific directory in a file system used by mobile operating system 102 to manage persistently stored objects. Mobile operating system 102 is connected to and manages app interactions with a display subsystem 112. Display subsystem 112 (sometimes "display") includes a touch-sensitive display device, for example, a capacitive or other display able to generate and provide to mobile operation system 102 signals representative of single and/or multi-touch gestures, such as swiping (and the direction thereof), pinching in or out, dragging, and dropping. A mobile app such as app 106 or app 108 may be configured to display app display pages, e.g., app user interface pages, content display pages, etc., via display 112. A mobile app also may be configured to receive user input provided via display 112, e.g., selection, dragging, dropping, and/or other user input associated with physical interactions with the touch-sensitive surface of display 112.

A mobile app, such as app 106 or app 108 of FIG. 1, typically provides access to app functionality via a mobile app user interface displayed via a display device of the mobile device. Information and/or user interactive controls may be displayed. Users may access further functionality and/or control the manner in which functionality is provided and/or the content displayed by performing touches and/or gestures (e.g., select an object, activate a button or other control, drag an object to a new location, drag an object to a location associated with a control input—such as dragging a file icon to a folder to add the file to the folder, etc.) Typically, mobile users navigate through successive pages of a mobile app's interface. However, typically to reach a previously-viewed mobile app page it is necessary to navigate back to that page, which requires the mobile app to regenerate the desired page and any intervening pages through which the user must navigate to get back to the desired page. Typically, a mobile app only has a single currently active page, i.e., the one currently being displayed.

Techniques to enable a user to more quickly navigate to a desired page are disclosed.

Figure 2:
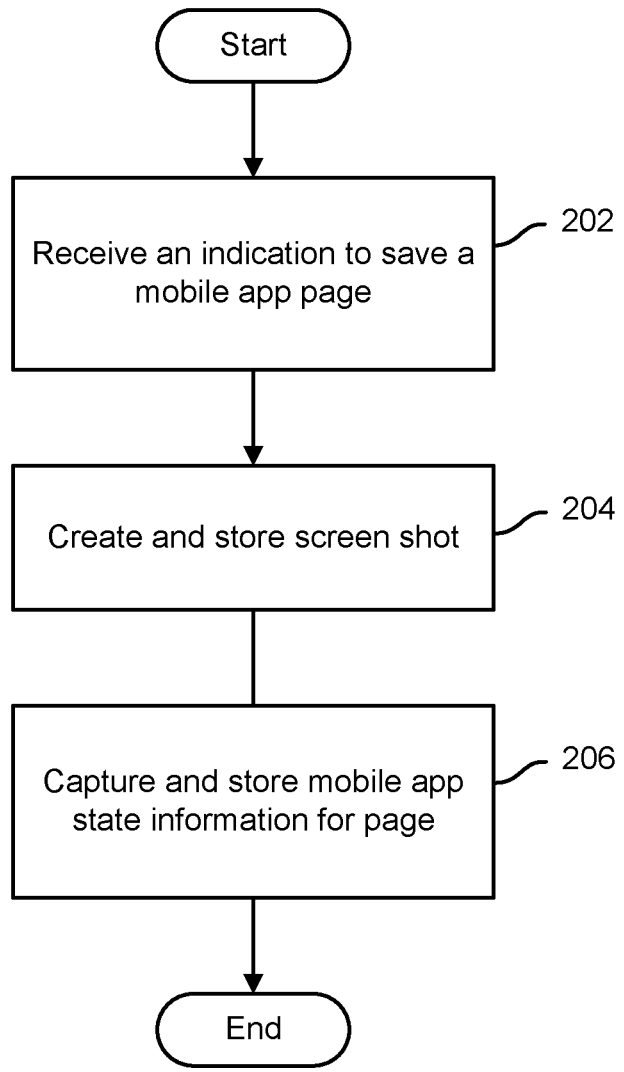
FIG. 2 is a flow chart illustrating an example embodiment of a process to provide a multilayer mobile app interface.

FIG. 2 is a flow chart illustrating an example embodiment of a process to provide a multilayer mobile app interface. In some embodiments, the process of FIG. 2 is performed by a mobile app, such as app 106 or app 108 of FIG. 1, using resources available to the mobile app on a mobile device, such as mobile device 100 of FIG. 1, e.g., mobile operating system 102, memory 110, and display 112. In the example shown, an indication is received to save a mobile app page (202). For example, in some embodiments a user may indicate explicitly a desire to "save" a mobile app page, portion of a page, link to a page, etc., such as by dragging a representation of the page or portion thereof to a "dock" region of the display, e.g., at the bottom of the display. In some embodiments, pages navigated to by a user may be saved as the user navigates away from them, to other pages. For example, when a user selects on a mobile app page an object that is associated with another page (e.g., choosing a folder from a list of folders, resulting in the folder being opened and a representation of the folder's content being displayed), the page that is being navigated away from is saved.

Referring further to FIG. 2, upon receiving an indication to save a page, a screen shot is taken of the current page (204). Typically, a page is rendered by mobile app user interface code, which may use custom and/or mobile operating system provided widgets, display containers, and other elements arranged to provide the mobile app page as rendered. A screen shot of the currently-displayed mobile app page typically would comprise a single, flattened image of the page as rendered, e.g., a jpeg or other image. In addition, mobile app state information associated with the page is stored (206). For example, runtime variables, context data, content objects currently displayed and/or represented on the page, etc. In various embodiments, the mobile app includes app code configured to use the captured screen shot to represent the saved page. In various embodiments, the save mobile app page state information may be used by the mobile app to quickly regenerate and display the saved page, e.g., in response to an indication that the user wants to jump back to that page.

Figure 3:
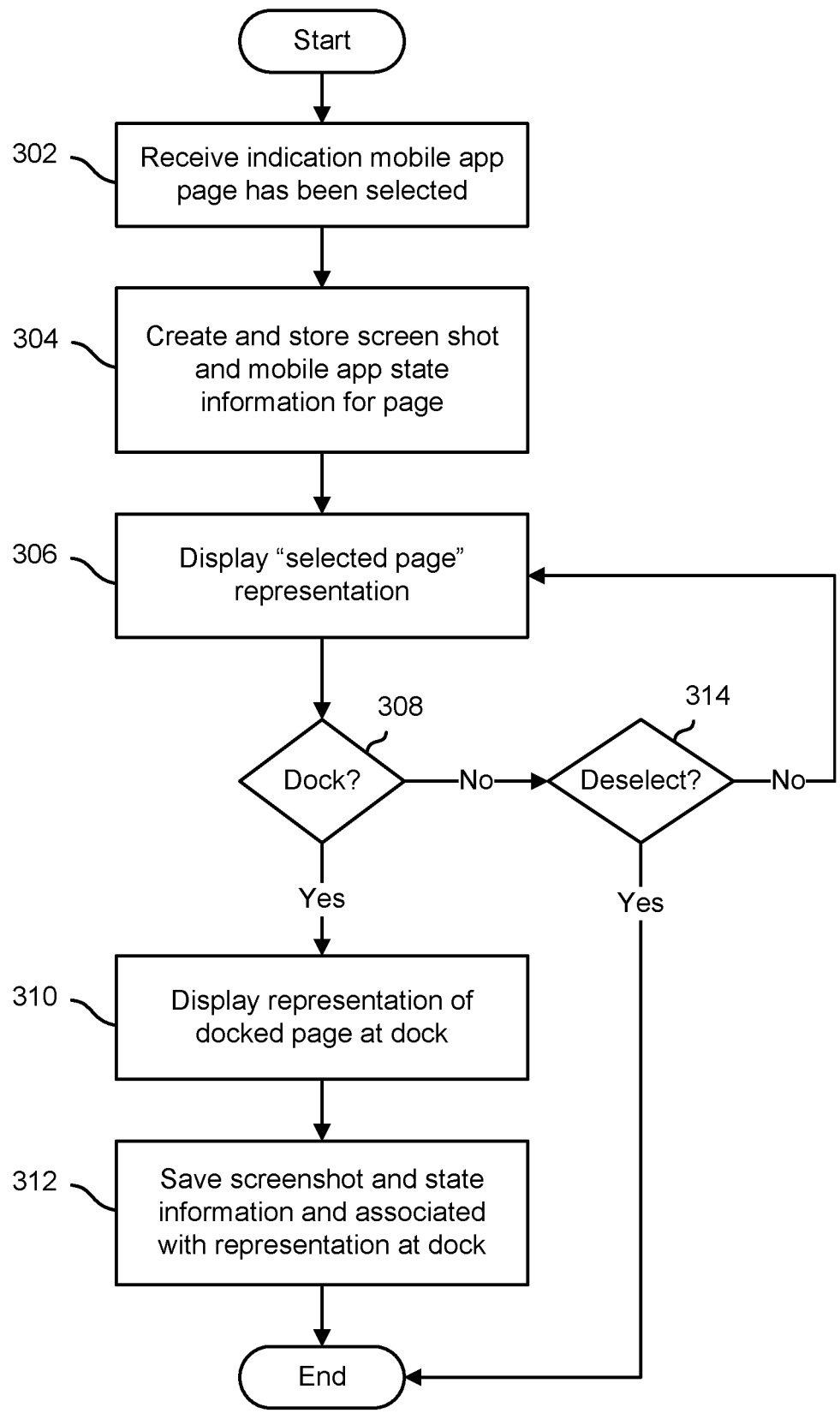
FIG. 3 is a flow chart illustrating an example embodiment of a process to provide a multilayer mobile app interface.

FIG. 3 is a flow chart illustrating an example embodiment of a process to provide a multilayer mobile app interface. In some embodiments, the process of FIG. 3 is performed by a mobile app, such as app 106 or app 108 of FIG. 1, using resources available to the mobile app on a mobile device, such as mobile device 100 of FIG. 1, e.g., mobile operating system 102, memory 110, and display 112. In the example shown, an indication is received that a mobile app page (or selectable portion thereof) has been selected (302). For example, in some embodiments a continuous touch for longer than a prescribed amount of time may indicate a desire to select the page (or portion thereof). A screen shot (image) of the selected page (or portion) is created and stored, along with associated mobile app state information (304). The selection page (or portion) is displayed as a "selected page" representation of the page (306). In some embodiments, the selected page (or portion) representation comprises a display of the screen shot in a reduced size in a foreground of the current page, with active portions of the current page dimmed or otherwise deemphasized in the background behind the image. If the user performs an input gesture associated with docking the selected page (or portion) (308), e.g., swiping toward a docking area at the bottom or another location of the display, a representation of the docked page (or portion) is added to a docked content display area (310) and the screen shot and associated state information are stored and associated with the representation displayed in the dock area (312). If the selected page (or portion) is deselected by the user without the docking gesture being performed (314), the process ends without the page (or portion) being added to the dock.

Figure 4A:
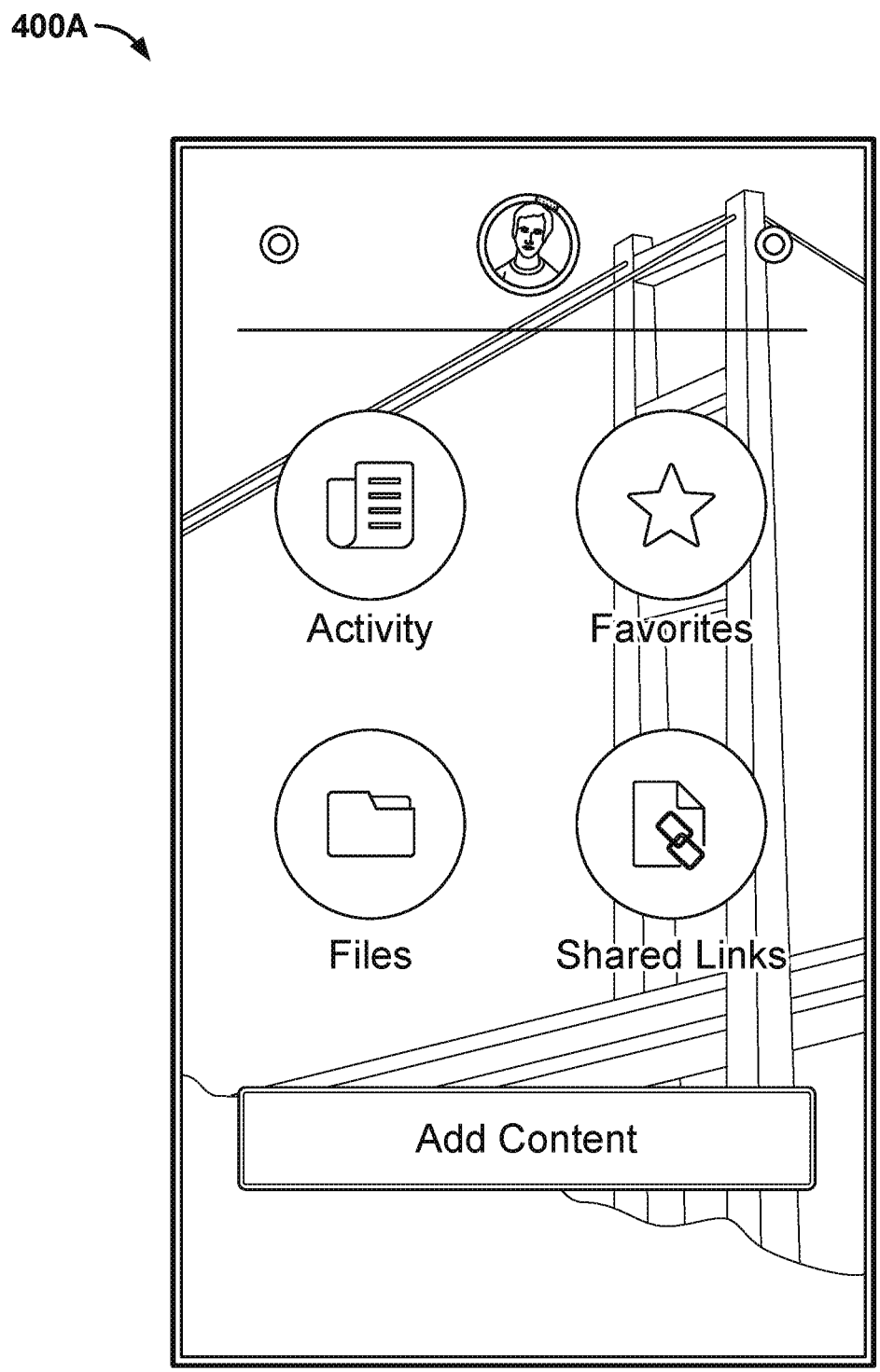
FIG. 4A is a block diagram illustrating an example embodiment of a mobile app home page.

FIG. 4A is a block diagram illustrating an example embodiment of a mobile app home page. In some embodiments, the mobile app home page of FIG. 4A may be displayed by a mobile app, such as app 106 or app 108 of FIG. 1, e.g., upon startup of the mobile app and/or selection of a control associated with returning to the home page. In some embodiments, the mobile app home page of FIG. 4A is associated with a mobile app provided by EMC® Corporation to provide mobile users with access to the EMC® Syncplicity® file sharing application and/or service, for example to enable users to share content via a mobile device, access content that has been shared with them, etc. In the example shown, mobile app home (or other "start") page 400A includes an icon at the top representing the mobile app user, in this example. In addition, mobile app home page 400A includes four user-selectable icons, one for each of four major functions of the mobile app. In the example shown, the four icons are labeled "Activity", corresponding to display of an "activity feed" of the user with respect to the mobile app; "Favorites", e.g., associated with favorite content items or other favorite features of the user with respect to the app; a "Files", e.g., to access files; and "Shared Links", e.g., to access content that has been shared by and/or with the user. In addition, there is a user-selectable control labeled "Add Content", for example to enable content objects stored on the mobile device to be associated with the mobile app.

In some embodiments, mobile app user interface code associated with mobile app home page 400A enables a user to select an icon, e.g., the "Activity" icon, and drag it to a region associated with a "dock" (e.g., the bottom of the display), to indicate that the associated feature is desired to be made available, via a representation of the feature in the dock, even if the user navigates to other pages of the mobile app.

Figure 4B:
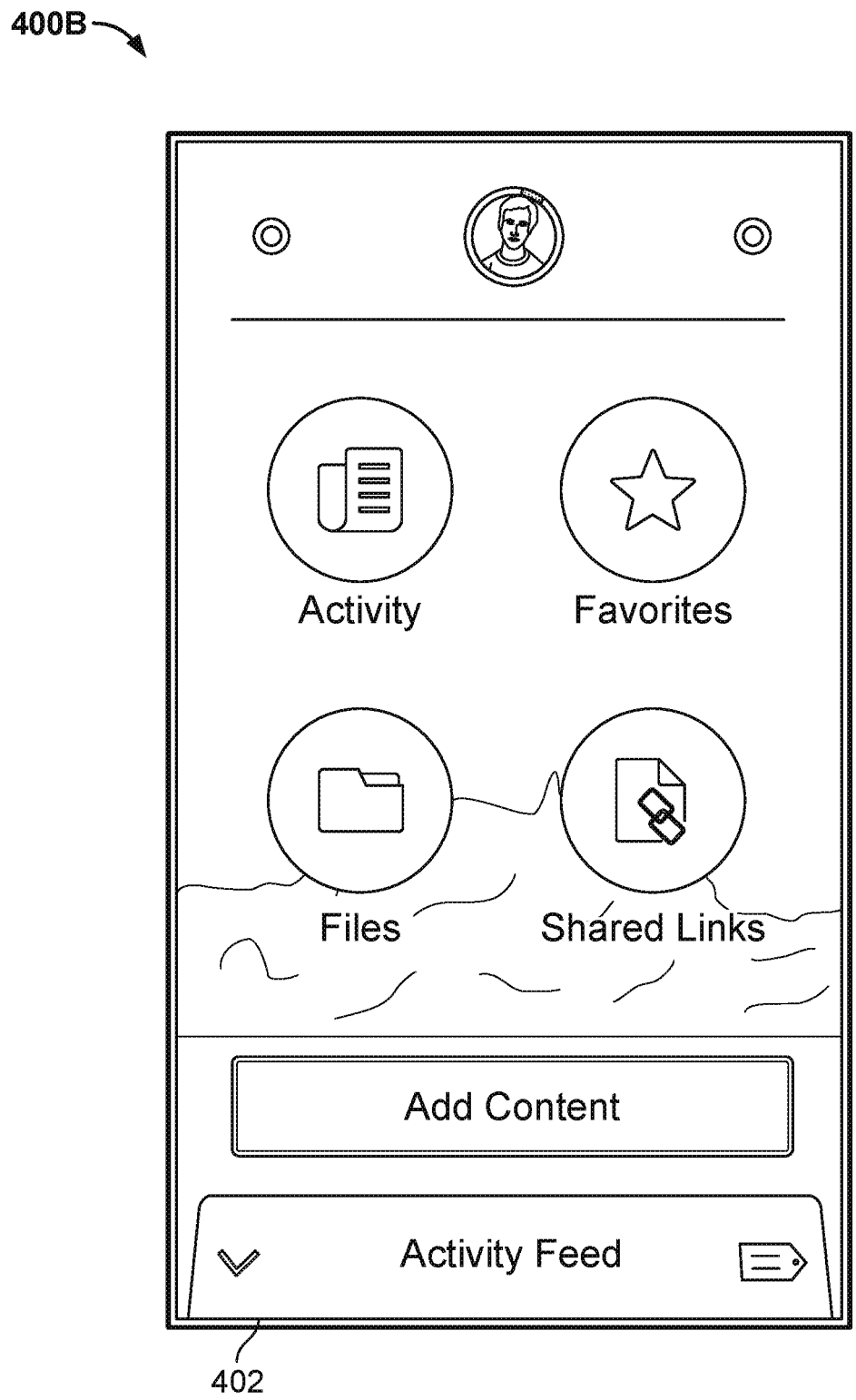
FIG. 4B is a block diagram illustrating an example embodiment of a mobile app home page with a dock area.

FIG. 4B is a block diagram illustrating an example embodiment of a mobile app home page with a dock area. In some embodiments, the mobile app home page with dock area of FIG. 4B may result from a user input (e.g., select and swipe down gesture) entered via mobile app home page 400A of FIG. 4A. In the example shown, mobile app home page 400B includes an "Activity Feed" feature that has been added to a dock area 402 at the bottom of the display. In various embodiments, the dock area 402 and associated representation of the "Activity Feed" feature may have been added to mobile app home page 400B by selecting the "Activity" icon in mobile app home page 400A of FIG. 4A and swiping down to/toward the bottom area of the display. In some embodiments, the representation of the feature "Activity Feed" in the dock area 402 is user-selectable, and selection of the representation results in the associated mobile app feature and content, in this example an activity feed (e.g., content shared by and/or with the user, in the context of a file sharing service with which the mobile app is associated), being accessed and provided. In some embodiments, a user may scroll or otherwise browse through multiple mobile app features and/or pages that have been docked, e.g., by swiping right or left, as desired, in the dock area 402. In various embodiments, features, pages, and/or content that have been docked remain available via the dock area as the mobile user navigates through pages of the mobile app.

In some embodiments, the dock area 402 may be hidden, e.g., by selecting and sliding the dock downward (or to another edge), as if shutting a drawer. In some embodiments, the dock area 402 may be accessed by touching an edge of the display to expose a tab or other control and dragging the dock area 402 out, as if opening a drawer.

Figure 5:
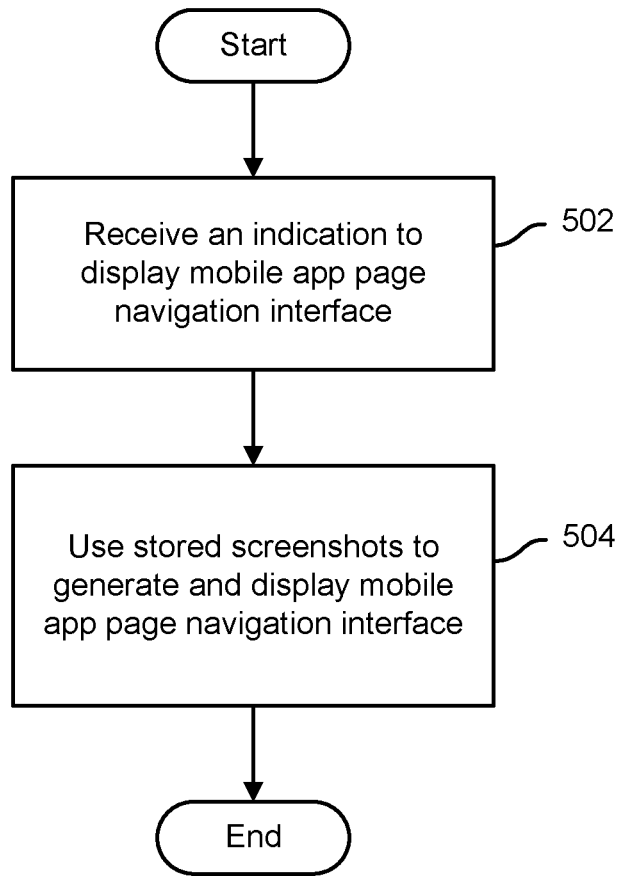
FIG. 5 is a flow chart illustrating an example embodiment of a process to provide a multilayer mobile app interface.

FIG. 5 is a flow chart illustrating an example embodiment of a process to provide a multilayer mobile app interface. In some embodiments, the process of FIG. 5 is performed by a mobile app, such as app 106 or app 108 of FIG. 1, using resources available to the mobile app on a mobile device, such as mobile device 100 of FIG. 1, e.g., mobile operating system 102, memory 110, and display 112. In the example shown, an indication is received to display a mobile app page navigation interface (502). For example, a user input may be received, e.g., via a user interface control, to browse previously-viewed mobile app pages.

Previously stored screenshots (taken, e.g., as the user navigated away from each previously-displayed page) are used to generate and display a mobile app page navigation interface (504). In various embodiments, a cover flow, loosely exploded stacked layer, stacked sheet, or other interface may be used to provide the ability to browse through snapshots to select a desired view to return to. For example, a navigation interface may be presented as a multilevel set of "sheets" that the user can slide across the display area and/or flip through quickly to find a desired page.

Figure 6:
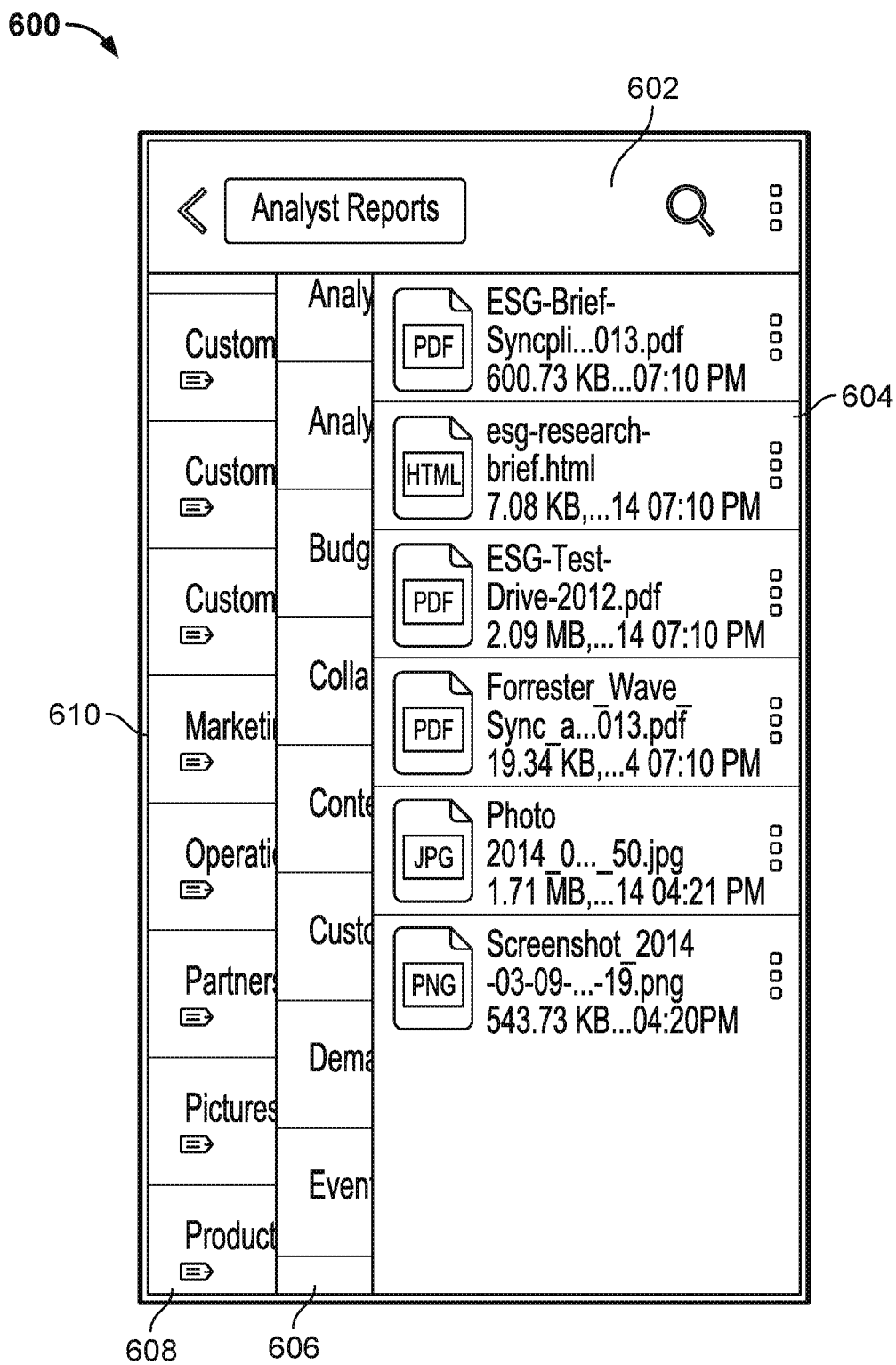
FIG. 6 is a block diagram illustrating an example embodiment of a navigable multilayer mobile app interface.

FIG. 6 is a block diagram illustrating an example embodiment of a navigable multilayer mobile app interface. In some embodiments, the navigable multilayer mobile app interface may be generated and displayed by a mobile app, such as app 106 or app 108 of FIG. 1, for example in connection with performing step 504 of the process of FIG. 5. In the example shown, previously-viewed mobile app pages, in this example pages associated with a folder hierarchy, are displayed so as to appear as a stack of sheets, with the higher level (parent) folder appearing below and partly covered by a next level folder/directory, etc. Specifically, navigable multilayer mobile app interface 600 includes a header portion 602, in which information identifying a currently active page 604 is displayed. In this example, content items (files) associated with a folder named "Analyst Reports" are represented in currently active page 604 as a set of user-selectable file icons. The currently active page 604 has been slid to the right by the user to reveal a stack of sheets that includes in this example a set of subfolders represented in a first sheet 606, and a set of folders at a next higher level in a folder hierarchy, represented in a second sheet 608. In sheet 606, a folder name associated with the currently active page is highlighted. Likewise, in sheet 608, a higher level folder that contains the subfolders represented in sheet 606 is highlight (at 610). In various embodiments, pages other than the currently active page 604, i.e., sheets 606 and 608 in this example, are represented in the interface 600 using screen shot images taken as those pages were displayed, e.g., as the user navigated down through the folder hierarchy to get to the currently active page 604.

In various embodiments, the screen shot images may be selected by the user to navigate (i.e., jump) directly to that page. As described above, in response to such selection previously-stored page state information may be used to quickly regenerate and display the selected page.

Figure 7:
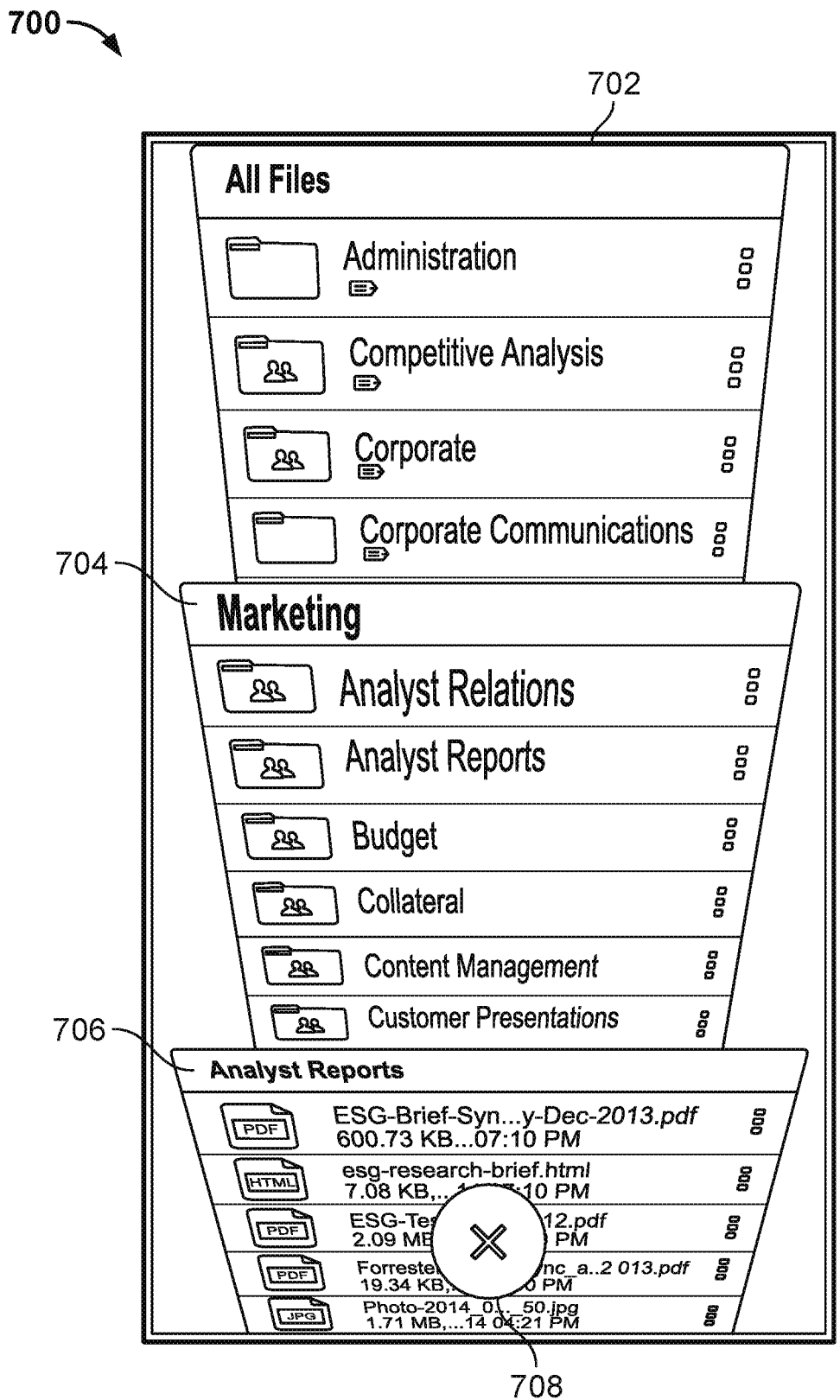
FIG. 7 is a block diagram illustrating an example embodiment of a navigable multilayer mobile app interface.

FIG. 7 is a block diagram illustrating an example embodiment of a navigable multilayer mobile app interface. In some embodiments, the navigable multilayer mobile app interface may be generated and displayed by a mobile app, such as app 106 or app 108 of FIG. 1, for example in connection with performing step 504 of the process of FIG. 5. In the example shown, previously-viewed mobile app pages, in this example pages associated with the same folder hierarchy as shown in FIG. 6, are displayed in a "cover flow" like manner. Specifically, navigable multilayer mobile app interface 700 includes a set of pages 702, 704, and 706. Page 702 may be associated with a currently active page, for example, and pages 704 and 706, respectively, may be pages previously viewed by the user or in some embodiments pages related (e.g., in a folder or other mobile app page hierarchy) to the currently active page. The multilayer mobile app interface 700 enables a user, in various embodiments, to flip through displayed pages to identify and select a desired page to navigate directly (back) to. In some embodiments, pages other than a currently active page may be represented by a screen shot image of such pages, and upon selection by the user of an image the associated page may be generated and displayed, e.g., using previously-stored page state information.

In the example shown in FIG. 7, the multilayer mobile app interface 700 includes a "dismiss" control area 708. In some embodiments, dragging a representation of a page (e.g., 702, 704, or 706) to the dismiss control area 708 results in that page being removed from the stack as displayed in multilayer mobile app interface 700.

Figure 8:
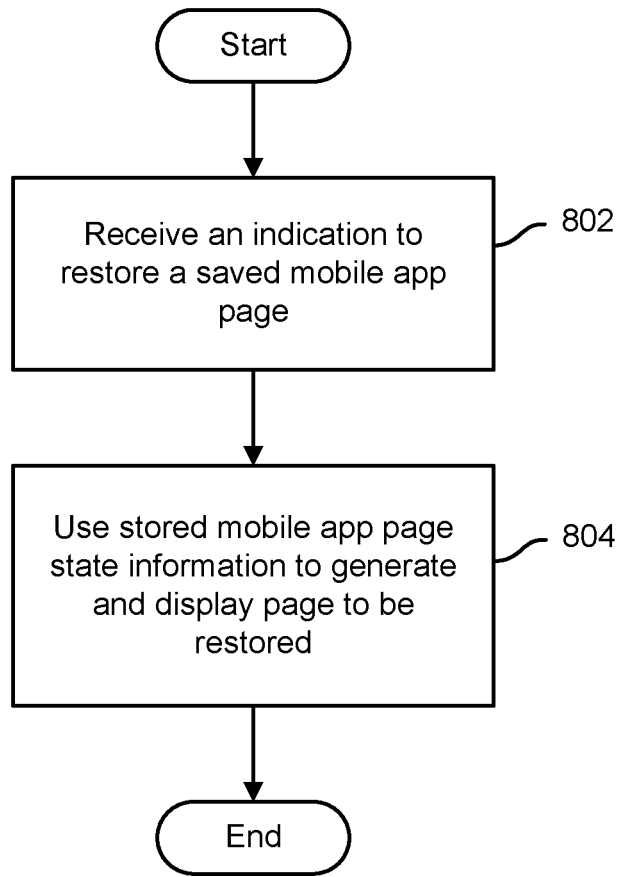
FIG. 8 is a flow chart illustrating an example embodiment of a process to provide a multilayer mobile app interface.

FIG. 8 is a flow chart illustrating an example embodiment of a process to provide a multilayer mobile app interface. In some embodiments, the process of FIG. 5 is performed by a mobile app, such as app 106 or app 108 of FIG. 1, using resources available to the mobile app on a mobile device, such as mobile device 100 of FIG. 1, e.g., mobile operating system 102, memory 110, and display 112. In the example shown, an indication is received to restore a previously-saved mobile app page (802). For example, a user may select a page as represented in a user interface such as interface 600 of FIG. 6 or interface 700 of FIG. 7. Previously-stored mobile app page state information associated with the page to be restored is retrieved (e.g., read from memory) and used to (re)generate and display the mobile app page to be restored (804).

In various embodiments, techniques disclosed herein may enable previously-viewed mobile app pages, and/or pages related (e.g., hierarchically) to a currently active mobile app page, to be represented, browsed through, and/or accessed quickly and using minimal mobile device and associated resources.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A method, comprising:
 displaying an application page;
 receiving, by one or more processors, an indication to provide a previously stored application page; and
 in response to receiving the indication to provide the previously stored application page, providing the previously stored application page based at least in part on information associated with the previously stored application page including information sufficient to regenerate the previously stored application page without obtaining additional data for the previously stored application page from a server or application associated with the previously stored application page.

2. The method of claim 1, further comprising:
 in response to receiving the indication to provide the previously stored application page, obtaining, by one or more processors, information associated with the previously stored application page from a local storage.

3. The method of claim 1, wherein the information associated with the previously stored application page includes a screenshot and application state information.

4. The method of claim 1, wherein the information associated with the previously stored application page from which the previously stored application page is provided is stored in response to receiving a request to capture a screen shot of the previously stored application page.

5. The method of claim 1, further comprising:
 displaying one or more images corresponding to representations of stored application pages, the one or more images including an image representing the previously stored application page, wherein the receiving the indication to provide the previously stored application page comprises receiving a selection of, from among the one or more images, the image representing the previously stored application page.

6. The method of claim 5, wherein the providing of the previously stored application page is based at least in part on the image representing the previously stored application page.

7. The method of claim 5, wherein the image representing the previously stored application page corresponds to a screenshot comprised in the information associated with the previously stored application page.

8. The method of claim 5, wherein the previously stored application page corresponding to the image representing the previously stored application page is a previously active application page.

9. The method of claim 1, wherein the information associated with the previously stored application page includes application state information, the application state information is stored locally at a mobile device associated with the one or more processors, the application state information remains stored locally at the mobile device in a circumstance according to which the previously stored application page is not being actively displayed, and the obtaining information associated with the previously stored application page comprises obtaining the application state information from local storage of the mobile device.

10. The method of claim 1, further comprising:
 receiving, by the one or more processors, an input associated with saving the application page; and
 in response to receiving the input associated with saving the application page, storing, by one or more processors, an image of the application page in the memory of a mobile device associated with the one or more processors.

11. The method of claim 10, wherein the input associated with saving the application page is a drag input of a representation corresponding to an activity of a user of the mobile device to a designated location on a user interface of the mobile device.

12. The method of claim 10, wherein the input associated with saving the application page comprises an indication to display a different application page.

13. The method of claim 12, wherein the indication to display the different application page comprises a user input associated with navigating to the different application page.

14. The method of claim 1, further comprising:
 displaying one or more representations of application pages, the one or more representations comprising a representation of the previously stored application page.

15. The method of claim 14, wherein each of the one or more of representations corresponds to a different saved application page for which application state information is stored locally.

16. The method of claim 14, wherein the one or more representations are arranged as a stacked set of user-movable sheets.

17. The method of claim 14, wherein the one or more representations are arranged as a stack of cards through which a navigable user interface enables a user to flip to locate a desired card.

18. The method of claim 1, wherein the information associated with the previously stored application page includes application state information, and the application state information includes one or more of one or more runtime variables, context data, or content objects displayed or represented on the application page at time of saving.

19. The method of claim 1, further comprising:
in response to receiving the indication to provide the previously stored application page, generating one or more intervening application pages associated with a navigation from a current page to the previously stored application page.

20. A system, comprising:
a display device;
a memory; and
a processor coupled to the display device and the memory and configured to:
display an application page;
receive an indication to provide a previously stored application page; and
in response to receiving the indication to provide the previously stored application page, provide the previously stored application page based at least in part on information associated with the previously stored application page including information sufficient to regenerate the previously stored application page without obtaining additional data for the previously stored application page from a server or application associated with the previously stored application page.

21. A computer program product, the computer program product being embodied in a non-transitory computer readable storage medium and comprising computer instructions for:
displaying an application page;
receiving, by one or more processors, an indication to provide a previously stored application page; and
in response to receiving the indication to provide the previously stored application page, providing the previously stored application page based at least in part on information associated with the previously stored application page including information sufficient to regenerate the previously stored application page without obtaining additional data for the previously stored application page from a server or application associated with the previously stored application page.

* * * * *